United States Patent [19]

Reavely et al.

[11] Patent Number: 4,772,437

[45] Date of Patent: Sep. 20, 1988

[54] METHOD OF MOLDING USING A SOLID FLOWABLE POLYMER MEDIUM WITH U.V. DETECTABLE ADDITIVE

[75] Inventors: Richard T. Reavely, Madison; David J. Parker, Newtown, both of Conn.; Robert V. Kromrey, Campbell, Calif.

[73] Assignee: United Technologies Corporation, Hartford, Conn.

[21] Appl. No.: 907,957

[22] Filed: Sep. 10, 1986

[51] Int. Cl.$^4$ ............................................. B29C 43/10
[52] U.S. Cl. ..................................... 264/22; 264/40.1; 264/313; 264/324; 419/49; 419/68
[58] Field of Search ...................... 264/40.1, 40.2, 233, 264/DIG. 51, 257, 316, 29.5, 314, DIG. 50, 552, 546, 572, 22, 313, 325, 500, 544, 570, 324; 100/211; 425/78, 387.1, 405 H, 405 R, 407, DIG. 14, DIG. 44

[56] References Cited

FOREIGN PATENT DOCUMENTS 2134168 1/1987 Fed. Rep. of Germany.

OTHER PUBLICATIONS

A.G.M.-130 Propulsion Module Proposal 84-32, vol. 3, Cost & Pricing Proposal (A).
AGM-130 Propulsion Module Proposal 84-32 A (B).
Reference Reply: 54-931-1934 (C).
Space Transportation System Solid Rocket Motor Second Source Study (D).
Air Force Checks Compatibility of Rockwell AGM-130 with F-111 (E).
FAC 84-26, 7-30-87 Part 2, Definition of Words & Terms (F).

Primary Examiner—James Lowe

[57] ABSTRACT

A solid flowable polymeric material useful as a pressurizing medium that is ultraviolet detectable and is particularly adapted for use in a molding process. The polymeric material comprises a substantially uniform mixture of a solid, flowable, particulate silicone having a nominal flow rate of at least 0.6 gram per second through a 1.1 cm diameter pipe 7.6 cm long under applied pressure of 10.34 MPa at room temperature and an ultraviolet detectable compound. The polymeric material is especially useful for molding composites. A composite is disposed with a pressure vessel which is substantially filled with the above mixture. The silicone is caused to produce a substantially uniform, predetermined medium pressure on the surface of said composite prepreg. The composite prepreg is cured to form a composite which is removed from the pressure vessel and exposed to ultraviolet light.

3 Claims, No Drawings

METHOD OF MOLDING USING A SOLID FLOWABLE POLYMER MEDIUM WITH U.V. DETECTABLE ADDITIVE

CROSS REFERENCE

This application relates to commonly assigned copending applications Ser. No. 829,048 filed Feb. 13, 1986, entitled "Molding Method and Apparatus Using a Solid, Flowable, Polymer Medium"; and Ser. No. 907,959 entitled "Solid Flowable Polymer Molding Medium"; Ser. No. 907,943 entitled "Solid Flowable Polymer Medium with Metal Additives and Method of Molding Using Same"; Ser. No. 907,946 entitled "High Temperature Solid Flowable Polymer Medium and Method of Molding Using Same"; Ser. No. 907,942 entitled "Method for Molding a Carbon-Carbon Composite"; Ser. No. 907,947 entitled "Method for Molding Using a Dual Solid Flowable Polymer System"; Ser. No. 907,952 entitled "Method for Recovering a Solid Flowable Polymer Medium"; Ser. No. 907,955 entitled "Solid Flowable Medium Having a Thermal Stability Additive and Method for Molding Using Same"; Ser. No. 907,958 entitled "Method of Vacuum Bagging Using a Solid Flowable Polymer"; Ser. No. 907,954 entitled "Improved Method of Fabricating Tubular Composite Structures", now U.S. Pat. No. 4,704,240, filed on even date herewith, which disclose material related to that contained herein, the disclosures of which are hereby incorporated by reference.

DESCRIPTION

Technical Field

The present invention relates to molding methods and compositions and specifically to a composition useful for molding articles under pressure.

Background Art

Composite materials are of great current interest because they provide a very favorable combination of high strength and low density. Typically, a composite material is comprised of fibers of graphite, boron, glass, and the like embedded within an epoxy, phenolic or other polymer resin matrix. The more advanced composites which have particularly favorable high strength to density ratio properties are especially attractive for aerospace applications. But typical of other advanced aerospace materials they present comparative processing difficulties; they cannot be made by a simple layup of the fibers and resin followed by room temperature curing. Aerospace composite materials not only involve more difficult-to-fabricate resins but often essentially defect-free finished parts must be produced. As a result, aerospace composites are typically molded and cured at elevated temperatures under substantial pressure.

Although a variety of molding processes have been used to mold composites at elevated temperatures and pressures (e.g. compression molding, isostatic pressure molding using pressure bags or pressure vessels, pressure pad molding) there are problems (e.g. bag leaks) associated with these processes.

Accordingly, there is a constant search for composite molding processes.

DISCLOSURE OF INVENTION

This invention is directed to a solid flowable polymeric material useful as a pressurizing medium that is ultraviolet detectable and is particularly adapted for use in a molding process. The polymeric material comprises a substantially uniform mixture of a solid, flowable, particulate silicone having a nominal flow rate of at least 0.6 gram per second through a 1.1 cm diameter pipe 7.6 cm long under applied pressure of 10.34 MPa at room temperature and an ultraviolet detectable compound.

Another aspect of this invention is a method of molding a composite using a solid, flowable particulate silicone that is ultraviolet detectable to facilitate detection as a pressurizing medium. A composite is disposed within a pressure vessel which is substantially filled with a substantially uniform mixture comprising a solid, flowable particulate silicone having a nominal flow rate of at least 0.6 gram/second through a 1.1 cm diameter pipe 7.6 cm long under applied pressure of 10.34 MPa at room temperature and an ultraviolet detectable compound. The silicone is caused to produce a substantially uniform, predetermined medium pressure on the surface of said composite prepreg. The composite prepreg is cured to form a composite which is removed from the pressure vessel and exposed to ultraviolet light.

This invention makes a significant advance in the field of molding by providing a pressurizing medium that is U.V. detectable facilitating its detection and cleanup.

The foregoing and other objects, features and advantages will be apparent from the specification and claims which will illustrate an embodiment of the invention.

BEST MODE FOR CARRYING OUT THE INVENTION

Generally, any ultraviolet detectable (U.V.) compound can be used with the practice of this invention. By detectable is meant that it is of a type and present in sufficient quantities that under exposure to ultraviolet light, the compound is detectable (e.g. unaided eye, commercial detection device. It is preferred that under exposure to ultraviolet light of about 320 nanometers (nm) to about 550 nm the compound radiates as then it is readily visible to the unaided eye. There are a variety of conventional compounds (e.g. organic or mineral) which have this property. Organic compounds are preferred for low temperature applications (e.g. typically less than about 316° C.) as they are stable at these temperatures, are readily uniformly dispersed in the polymer medium described below and are visible to the unaided eye. A preferred series of fluorescent compounds stable to at least 316° C. is manufactured by Shannon Luminescent Materials Co. (Santa Ana, Calif.). A typical tracer is C-206 stilbene compound. It is preferably used at concentrations of 0.01% to 0.1% and can be added to the prepolymer during manufacture. An alternate method of addition would be to add the tracer to cured medium in a chlorinated solvent solution. The solvent could be stripped by a vacuum/heat process. Other preferred compounds include aromatics such as FLUOREL TM 084 anthraquinone, FLUOREL TM 086 napthxanthene, and FLUOREL TM 088 xanthane available from BASF's Wyandotte Division (Wyandotte, Mich.). These are believed stable up to about 204° C. Typically about 0.01% to about 0.001% by weight of the above aromatics are used in a mixture with the polymers described below, however amounts outside of this range may be used if desired so long as they are still detectable and do not adversely affect the flowable nature of the polymers described below. Mixtures of these compounds and derivatives of them are believed to function as well.

Mineral fluorescent compounds are preferred for higher temperature applications since they are more stable at elevated temperatures. However, many mineral fluorescent compounds contain sulfur (mineral sulfides) which may degrade the polymethylsiloxane based molding medium described below. In addition, mineral compounds must be ground into pigment form for uniform dispersion (in contrast to many organic compounds which can be dissolved). Finally, fluorescent minerals typically require high power U.V. sources and commercial detection systems.

The particular polymeric medium useful in the present invention is a critical component. Its responsiveness to temperature and pressure coupled with its flowability and solid nature at molding temperatures enable it to be useful. These properties cause the medium to produce an advantageous, substantially uniform, controllable pressure on the surface of the article precursor. In a typical embodiment of the invention, the polymer is an unfilled silicone rubber particulate of −4+30 U.S. mesh sieve size (4.7–0.42 mm), which when pressurized, is sufficiently self-compliant to coalesce as an essentially void-free medium at a pressure of the order of 69 kPa (10 psi).

Typically, a silicone rubber is used as the pressurizing polymer. Most preferably, the rubber is an improvement on the type which is described in U.S. Pat. No. 3,843,601 to Bruner. See also U.S. Pat. No. 4,011,929 to Jeram et al. The disclosures of both patents are hereby incorporated by reference. Generally, the preferred materials are dimethylsilicones that have vinyl groups. They may be produced by conventional commercial procedures, including production from polysiloxanes using various vulcanizing techniques. A preferred material which has been used thus far is the experimental unfilled silicone rubber material designated as X5-8017, formerly No. 6360 81 (more simply 8017 hereinafter), by the Dow Corning Corporation, Midland, Mich., USA.

Another Dow Corning silicone rubber, No. 93–104, without its ordinary fillers (called "93–104" herein, nonetheless) is useful. The Polygel C-1200 silicone rubber (Stauffer Chemical Company, Westport, Conn. USA), believed to be essentially the material which is described in the Bruner U.S. Pat. No. 3,843,601 is also useful with the present invention. Other preferred materials are the Dow Corning Nos. X5-8001, 8002, 8023 and 8026 polymers.

While the preferred materials are silicone rubbers, other polymer materials having the desired characteristics can be used. Most silicone rubbers are temperature limited for long term use, e.g. typically up to about 400° F. However, silicone resins of the vinlymethylsiloxane and silphenylene types have been successfully tested up to about 900° F. Fillers and other adulterants (such as the metal particulates described below) can be included with and within the medium, provided the essential behavior properties are maintained.

The preferred 8017 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50-55) and compressive strength of the order of 70 kPa when measured on a 2.5 centimeters (cm) square by 1.27 cm thick specimen, and upo a compression deformation of about 40 percent it shears into smaller particles. This behavior is contrasted with that of more conventional rubbers which have higher strength, greater resistance to deformation and greater elongation to failure. It has also been observed that a preferred polymer useful with the present invention forced through a small orifice, or through a 1.1 cm diameter pipe as described below, has a tendency to disintegrate into smaller particulate. By example, it is found that over time a nominal 30 mesh size powder having about 50 weight percent retained on a 40 mesh screen will change to one having only about 25 weight percent retained on 40 mesh.

The aforementioned behavior of the polymer enables the fabrication of intricately shaped composite polymer parts with uniform properties under the controlled and independent application of uniform pressure and temperature. In one embodiment of the invention, the polymer has a Shore A hardness of less than about 15, typically less than 8, and desirably less than 1; the compressive strength is less than 1 MegaPascal (MPa), and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present mediums from those which have been used heretofore in the pressure pad molding technique. The flowability property can inferentially be seen to be analogous to viscosity. But there is no evident standard test known for measuring this property of importance to the invention and therefore a test apparatus was created as described above comprised of a cylinder having a downwardly movable piston to test the polymer portion of the medium. The cylinder is filled with the rubber or other medium being tested. A replaceable pipe extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32–64 RMS (root mean square) surface finish. The pipe length is chosen as desired, with 7.6 cm and 15.2 cm being preferred.

Thus, generally it can be said that the polymer will have flowability, i.e., mass transport can occur when molding pressures are applied. The preferred polymer, when tested in the apparatus described above using 10.3 MPa (1500 psi) and a 15 cm (6 inch) pipe, has a flow rate of at least 0.6 gram per second (g/s), typically 6 g/s, and desirably more than 25 g/s.

A particulate elastomer is typically used in the practice of the invention. When the 8017 polymer is used as particulate solids, prior to the application of pressure the particulates are spaced apart at the article precursor surface. But when pressure is applied, the particles self-comply and coalesce into a continuous void-free body. With the addition of a eutectic alloy (or metal), the alloy fuses and conforms to the particle shape. Because of this and their inherent resilience, a uniform hydraulic-like pressure is applied to the article precursor surface. Tests show that the 8017 material without the metal additive will tend to coalesce upon the application of moderate compressive pressure, of the order of 70 kPa; at this point the interfacial boundaries between the particles are so essentially conformed that the compresed rubber becomes translucent instead of opaque. The 8017 material has a true density of 0.97 gram per cubic centimeter (g/cc), an apparent bulk density of 0.5 g/cc as a −30 mesh size powder, and it is compressed to a coalesced translucent material with a density of 0.94–0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 350 kPa, preferably 240 kPa; more preferably about 69 kPa.

Based on various molding tests and material property measurement, desirable results have been associated with mediums having low strength, the ability to self-comply under molding level pressures, and the ability to flow and exhibit hydraulic-like behavior. The tendency toward friability has been observed and is believed associated with the flowability behavior. Other silicone rubbers than 8017 have been used up to the date of this application, and it is within contemplation that there are still other organic polymers and other materials which are either known or can be developed which will carry out the essential features of the invention.

The usefulness of the materials is also evaluated according to the integrity of a molded finished product, it being well established that inspection will commonly show areas of low density, cracking or lack of compaction/densification where the proper application of pressure and temperature has not been achieved, during either the heating or cooling cycle.

The polymer have only been characterized according to the properties of some currently available materials; the data are insufficient to establish that the totality of measured properties in combination are necessary. On the contrary, to a significant extent it is believed there is a redundancy and that they independently characterize the invention.

Having described the ultraviolet detectable compound and solid flowable polymer, the method according to this invention follows. A composite prepreg or other article to be molded is placed within a pressure vessel. The pressure vessel used can be virtually anything that can provide support and/or structural support to the medium and/or article to be molded. Thus, it can be a vacuum bag in combination with a tool or a metal vessel (e.g. stainless steel, alloy steel). In other words, the pressure vessel is an article(s) that contains the article to be molded.

It is desirable that the vessel contain mainly the desired polymer medium and the composite being molded. However, it will be appreciated that there will be allowed other objects, particles and materials to be contained within the medium. While the material is described as being essentially void-free during molding, such reference is to the absence of spaces between the individual pieces of the medium, and is not a limitation on such occasional voids as may be in the composite piece due to the nature of its manufacture.

The vessel is then filled with the polymer-U.V. detectable compound mixture described earlier. The polymer medium is then caused to produce a substantially uniform, predetermined medium pressure on the surface of said article precursor. This pressure is that desired to aid in molding the article. Pressures can range from ambient to 20.682 MPa (3000 psi). Although it is believed pressures up to 138 MPa (20,000 psi) can be used. The polymer medium can transfer pressure such as from a vacuum bag that surrounds it or a piston. Alternatively, upon the application of heat (e.g. 100° C. to about 150° C.) the polymer medium expands and when contained by the pressure vessel causes pressure to be applied to the article to be molded. The article is cured (e.g. annealed, molded, etc.) by the application of heat and optionally pressure at conventional temperatures (e.g. such as the heat used to expand the polymer medium or lower.) The heat used to expand the polymer may be applied locally or away from the article being molded where, because of its thermal insulative properties it will not affect the temperature of the article. The polymer medium transmits substantially uniform pressure throughout the vessel because of its flowable nature, but retains heat.

The molded article is removed from the pressure vessel and the polymer medium is removed from the surface by conventional means such as vacuuming, brushing or air or vapor blast. Next, the article is exposed to ultraviolet light (e.g. about 320 nm to about 400 nm) and any residual silicone type polymer material remaining on the surface is easily detected by visual examination. The residual polymer is removed until a U.V. light exposure reveals that there is substantially no residual polymer left. By substantially is meant a density of particles determined by mechanical testing (overlap shear in the case of a bonding surface) or by an experience factor where silicone particle contamination of downstream operations (fitting and assembly areas) is of primary concern. The article can then be bonded to another article, transferred to other "clean" work stations or used in any other desired manner. Additionally, U.V. exposure of work areas, lab coats, etc. enables the polymer to be detected and cleaned from surfaces.

While it is desirable to introduce and reuse the more preferred polymers in the molding apparatus as a particulate, it is possible to introduce the materials partially or wholly as a large single solid. During molding, there can be movement of the medium within the vessel and ancillary equipment (when used). Such flow will tend to break up the medium into particles, as will any other repeated substantial deformation of the medium. Thus the phenomena associated with the use of particulates in the preferred mode will also be observed in the use of the singular solid mass.

The invention has been described in terms of the molding of a composite polymer material (e.g. conventional polyamide, polyimide, epoxy resins, and even polyetherketone and polysulfone resins, etc. filled with conventional glass fiber, graphite fiber etc.), but it should be evident that the invention will be equally applicable to the molding of other composite materials, laminates, and to the processing of articles made of other materials, including metals (such as conventional powder metal preforms, e.g. aluminum) and ceramics and reinforced ceramics. The term molding as used herein is intended to embrace all material processinq in which pressure is applied to the surface of the material.

The following table details the deleterious effect of residual silicone type polymer on adhesively bonded composite joint strength:

| Single Overlap Shear @ Room Temperature Using EA 9309.3 NA Epoxy (Hysol Div. Dexter, Pittsburg, CA) | |
| --- | --- |
| | Percent of Baseline Shear Strength |
| No Silicone Polymer Present Peel Ply Used Baseline | 100% |
| Silicone Polymer Present on Surface | 35% |

The present invention enables particularly good control over the pressure and temperature to which the article is subjected. Because the medium is solid, the article being molded need not be sealed in a manner which is impervious to gas or liquid, greatly alleviating problems with prior art methods such as bagging. The articles produced are considerably more uniform in properties, especially when of complex shape, compared to articles produced by the prior art method, for example. The detection of the residual polymer medium allows virtually the complete removal of the medium from composite surfaces resulting in bond strengths comparable to those attained by conventional processing techniques. This detection also enables the cleaning of work areas etc. to avoid contamination. Thus, this invention makes a significant advance in the aerospace industry by providing methods of molding at elevated temperatures and pressures.

It should be understood that the invention is not limited to the particular embodiment shown and described herein, but that various changes and modifications may be made without departing from the spirit or scope of this concept as defined by the following claims.

We claim:

1. A method of molding a composite comprising
   (a) disposing a composite prepreg within a pressure vessel;
   (b) substantially filling the vessel with a substantially uniform mixture comprising a solid flowable particulate silicone having a nominal flow rate of at least 0.6 gram/second through a 1.1 cm diameter pipe 7.6 cm long under applied pressure of 10.34 MPa at room temperature and an ultraviolet detectable compound;
   (c) causing said silicone to produce a substantially uniform, predetermined medium pressure on the surface of said composite prepreg; and p1 (d) curing said composite prepreg to form a composite;
   (e) removing said composite from said pressure vessel; and
   (f) exposing said composite to ultraviolet light wherein said ultraviolet detectable compound facilitates the detection of any residual solid flowable polymer on the surface of said composite.

2. A method of molding an article precursor into an article at an elevated temperature as recited in claim 1 wherein said ultraviolet detectable compound is anthraquinone, napthxanthene, xanthan, stilbene, derivative thereof or a mixture thereof.

3. A method of molding an article precursor into an article at an elevated temperature as recited in claim 2 wherein said mixture comprises about 0.01% to about 0.001% ultraviolet detectable compound.

* * * * *